UNITED STATES PATENT OFFICE.

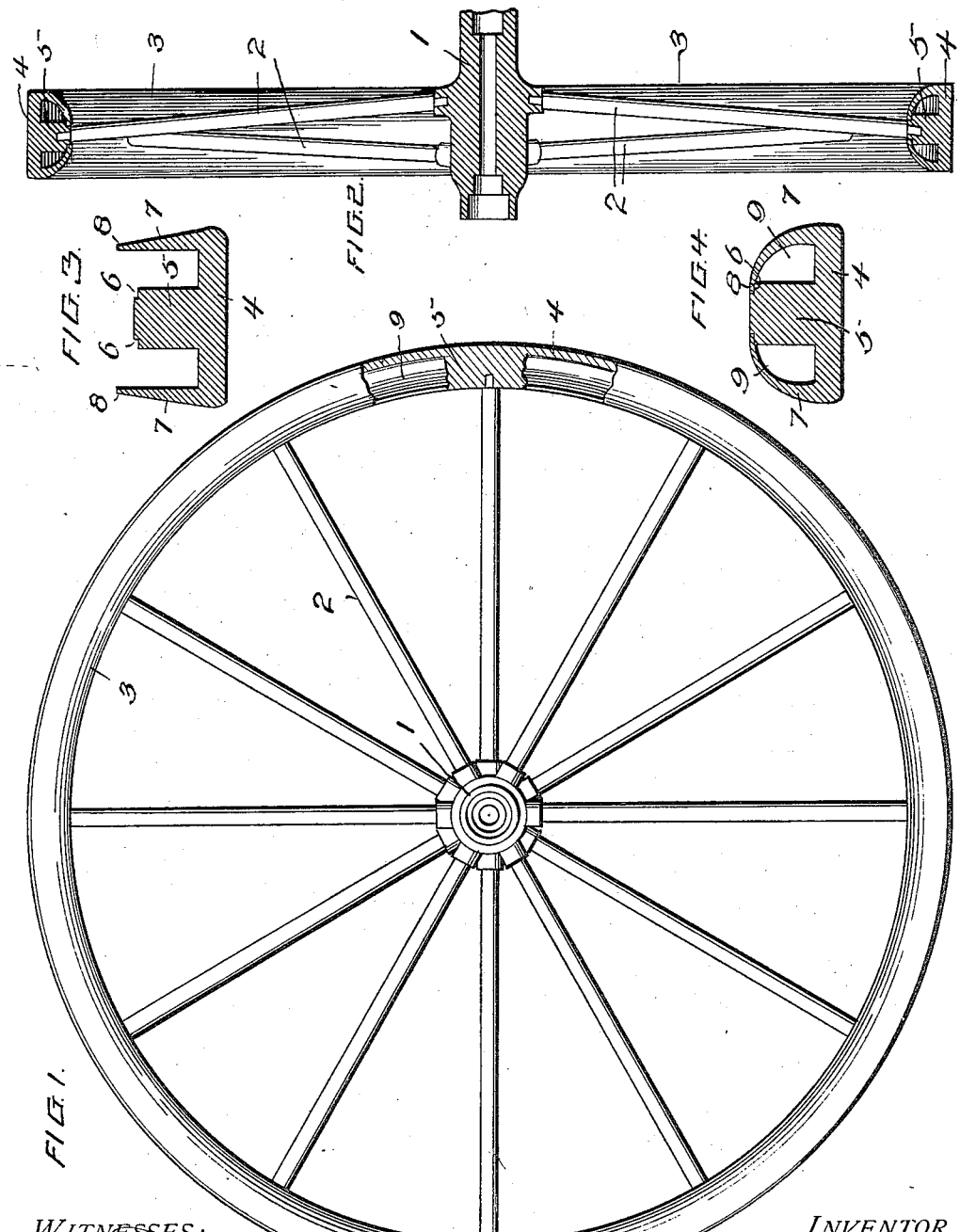

OLAF T. SVENSEN, OF DAVENPORT, IOWA.

METALLIC WHEEL-RIM.

1,031,972.  Specification of Letters Patent.  Patented July 9, 1912.

Application filed November 10, 1911. Serial No. 659,517.

*To all whom it may concern:*

Be it known that I, OLAF T. SVENSEN, a citizen of the United States, residing at Davenport, in the county of Scott and State of Iowa, have invented a certain new and useful Metallic Wheel-Rim; and I do declare the following to be a full, clear, and exact description of the same, such as will enable others skilled in the art to which it pertains to make and use the same.

My invention relates to an improved process of manufacturing wheel rims and it consists of certain novel features hereinafter fully described and specifically pointed out in the claim.

The object of my invention is to provide a hollow metallic wheel rim, substantially U shaped in cross-section formed with a relatively broad tire, the curvature of the inner convex surface of the rim being designed in such manner as to cause the tread of the wheel to disturb the dusty surface of the roadway to a minimum extent.

Many other objects and advantages will be hereinafter referred to and particularly pointed out in the claim.

In the accompanying drawings, Figure 1 is a front elevation partly in section and partly broken away, of a wheel embodying my invention, Fig. 2 is a transverse section of the same, Fig. 3 is a transverse section of the rim and tire in process of formation and Fig. 4 is the same when fully formed.

Similar reference characters refer to similar parts in all the drawings.

The hub and spokes may be of any suitable design and they form no part of the present invention.

The tread or tire 4 is formed with a rib 5 and upwardly projecting flanges 7 of malleable metal and the flanges are designed to be bent mechanically from the form shown in Fig. 3 to that shown in Fig. 4 and the flanges 7 integral with the tire and formed perpendicularly to the respective edges thereof are brought into engagement with the oppositely disposed channels 6 on the central rib 5. This central rib 5 may be provided with apertures suitable for the reception of the ends of the spokes 2, set by any means desired in the hub 1. The entire rim 3 is finished smoothly and the edges 8 of the flanges 7 are securely joined to the edges of the channels 6 extending longitudinally completing the whole rim as shown at 6 in Fig. 4. The flanges 7 are bent toward the rib 5 and the process of bending affects the entire flange but more particularly that portion from about the middle portion longitudinally thereof as indicated by the numeral 9.

The advantage of the process of manufacture as above described is principally comprised in the fact that a hollow rim provided with a central rib can be formed without a joint adjacent to the tread. The conjunction in the rim of the oblate curvature of the cross-section with a broad tread formed without an intervening joint is found to raise a minimum amount of dust from the roadway and the dust raised finds no convenient resting place on the wheel rim as is the case when rims of angular section are employed.

My invention further possesses many advantages over the present state of the art in that a considerable reduction in the weight of the wheel is effected without loss of the necessary strength.

What I claim as my invention and desire to secure by Letters Patent is—

A felly for wheels comprising an endless tube of the same transverse contour throughout the walls of which consist of a flat portion curved portions springing from the sides of the flat portion, a longitudinal rib of rectangular cross-section springing centrally from said flat portion and provided with channeled recesses in the corners thereof receiving the edges of the curved portions.

In testimony whereof, I affix my signature in the presence of two subscribing witnesses.

OLAF T. SVENSEN.

Witnesses:
J. A. HANLEY,
MAY BOETTCHER.

---

Copies of this patent may be obtained for five cents each, by addressing the "Commissioner of Patents, Washington, D. C."